No. 620,666. Patented Mar. 7, 1899.
S. OLIGER.
CAR STEP.
(Application filed May 27, 1898.)

(No Model.) 2 Sheets—Sheet 1.

WITNESSES:

INVENTOR
S. Oliger
BY
ATTORNEYS.

No. 620,666. Patented Mar. 7, 1899.
S. OLIGER.
CAR STEP.
(Application filed May 27, 1898.)
(No Model.) 2 Sheets—Sheet 2.
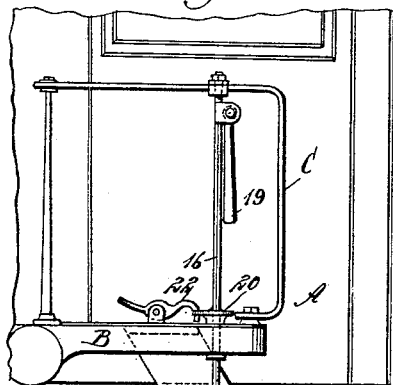
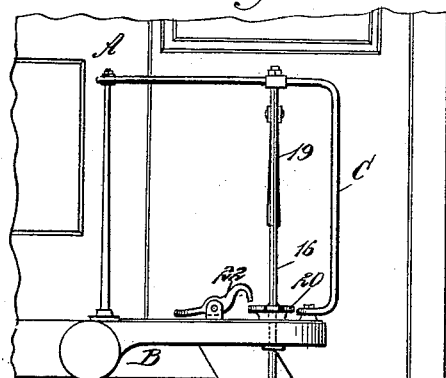
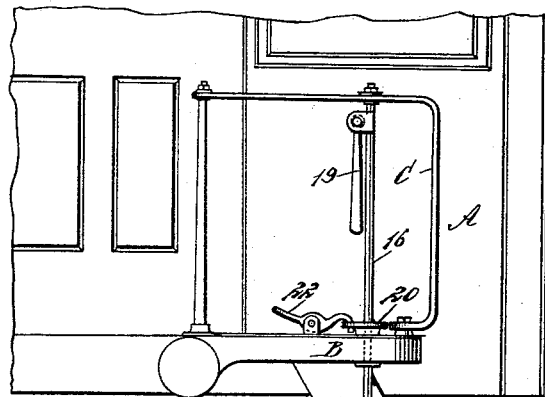
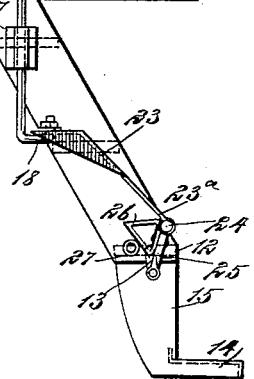
WITNESSES:
INVENTOR
S. Oliger,
BY
ATTORNEYS.

UNITED STATES PATENT OFFICE.

STEPHAN OLIGER, OF BURKETTSVILLE, OHIO.

CAR-STEP.

SPECIFICATION forming part of Letters Patent No. 620,666, dated March 7, 1899.

Application filed May 27, 1898. Serial No. 681,861. (No model.)

*To all whom it may concern:*

Be it known that I, STEPHAN OLIGER, of Burkettsville, in the county of Mercer and State of Ohio, have invented a new and useful Improvement in Car-Steps, of which the following is a full, clear, and exact description.

The object of the invention is to provide a simple and economic means whereby when occasion requires the number of steps appertaining to a car-platform may be increased and the additional step or steps be held as firmly in place as the regular steps.

A further object of the invention is to so construct and hang the additional step or steps that when not required they may be made to rest upon the ordinary steps in such manner as to be secure and out of the way.

Another object of the invention is to provide means whereby the auxiliary steps may be operated from the platform of a car.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
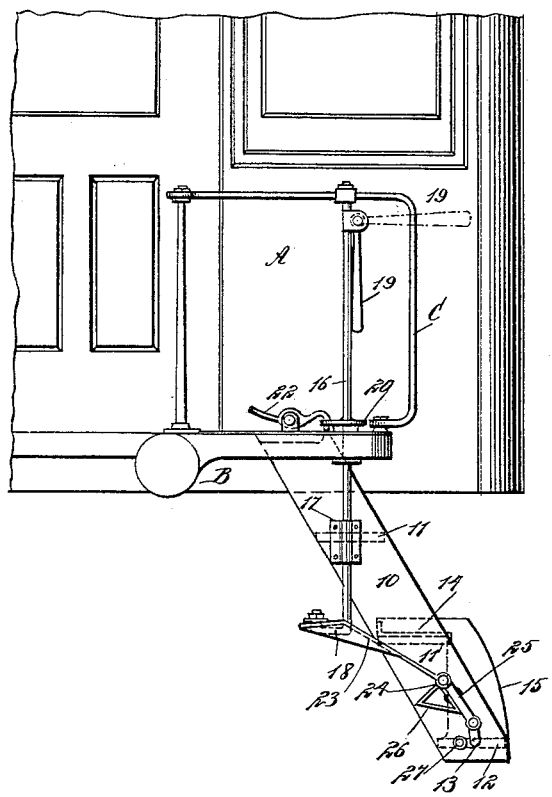
Figure 2:
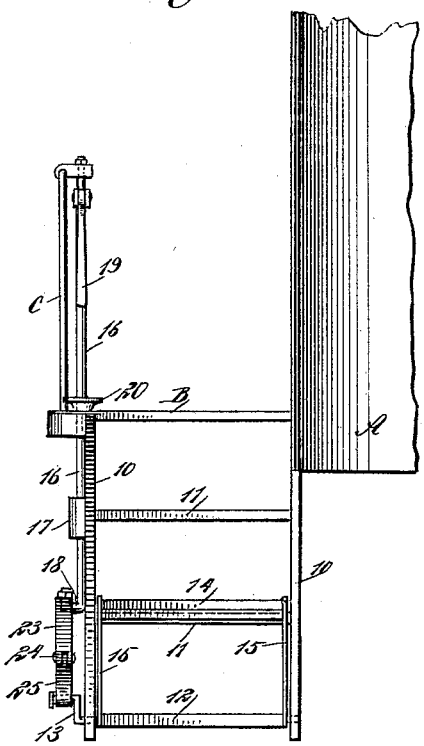
Figure 3:
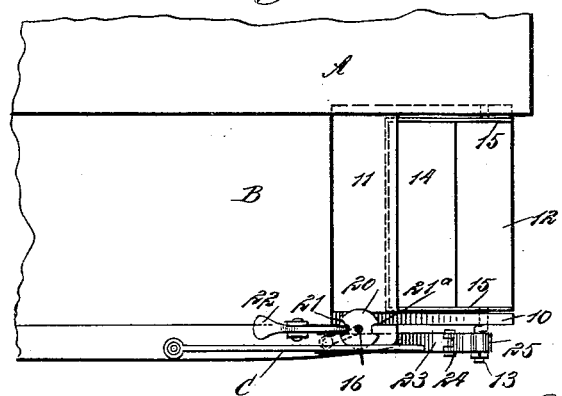

Figure 1 is an end view of a portion of a car and a side elevation of the car-steps, illustrating the additional steps as folded upon the ordinary steps. Fig. 2 is a side elevation of the platform of a car and a front elevation of the steps, the auxiliary or additional steps being in the position shown in Fig. 1. Fig. 3 is a plan view of the steps and a portion of the platform of a car, the adjusting-shaft for the auxiliary steps being in horizontal section. Fig. 4 is a partial end view of a car and a partial side elevation and vertical section of the steps, showing the auxiliary steps as folded upon the ordinary steps. Fig. 5 is an end view of a portion of the car, showing the steps in side elevation and the devices for operating the auxiliary steps as having partially carried the auxiliary steps over the ordinary steps; and Fig. 6 is a view similar to Fig. 5, the auxiliary steps being shown as constituting an extension for the ordinary steps.

A represents a car, B the platform, and C the railing for the platform. The platform is provided with the usual car-steps, comprising string-pieces 10 and steps 11 and 12, the steps 11 being fixedly secured to the string-pieces, while the bottom step 12 is pivoted upon the said string-pieces, and the outer trunnion of the lower pivotal step 12 is provided with a crank-arm 13. An additional step 14 is attached by auxiliary string-pieces 15 to the end portions of the pivotal step, and the auxiliary string-pieces 15 are of such length that the auxiliary or additional step 14 may be folded over and made to rest upon the upper surface of the lowermost fixed step or the second step from the bottom of the main string-pieces 10, as illustrated in Fig. 4.

When the auxiliary step 14 is in the position shown in Fig. 4, it will in no manner interfere with a person's passage either up or down the steps and will serve practically as a cover for the lowermost fixed step, suitable devices, to be hereinafter described, holding the auxiliary step either in its upper folded position or in its lower dropped position, which latter position is shown in Fig. 6.

A vertical shaft 16 is journaled in the railing C and in the platform B, the said shaft being carried below the platform and its lower end journaled in bearings 17, attached to the outer face of the outer main string-piece 10. The shaft 16 terminates in a crank-arm 18 at its lower extremity. The shaft near its upper end is provided with a handle 19, preferably having a hinged connection with the shaft, so that when not in use it may lie parallel with the shaft. Just above the platform B a ratchet-wheel 20 is secured on the shaft 16, and this ratchet-wheel is provided with recesses (usually two) made in opposite edges, as shown in Fig. 3, in which the recesses are designated as 21 and 21$^a$. A lock-lever 22, usually operated by the foot, is pivoted on the platform, and one end of the said lever is adapted to enter one or the other of the recesses in the said ratchet-wheel 20.

A pitman 23 is pivotally attached at one end to the crank-arm 18 at the lower end of the shaft 16. This pitman is constructed, preferably, of a spring material, its upper end, or that end which is pivoted to the crank 18, being straight and the remaining portion downwardly inclined, as shown in Figs. 1, 5, and 6. The upper portion of the pitman is compressed in a manner to render it quite stiff; but the lower portion 23ª is capable of spring action, and this lower portion 23ª of the pitman is pivotally connected by a pin 24 with one end of a link 25, the other end of the link being pivoted upon the crank-arm 13, attached to the lower or pivotal step.

A triangular block 26 is secured to the rear face of the link 25, the upper portion of the block being close to the pivotal connection of the link with the pitman 23. When the auxiliary steps are folded upon the ordinary steps, as shown in Fig. 1, what may be termed the "upper face" of the block will be out of engagement with the lower end of the pitman 23; but when it is desired to lower the auxiliary step or steps the shaft 16 is revolved—for example, toward the left—whereupon the pitman will be carried downwardly and forwardly, placing the link 25 at almost a right angle to the pitman, and when the link is in this position the auxiliary steps will have been carried away from the ordinary steps, as shown in dotted lines in Fig. 5, to such an extent that they will be almost ready to drop. This action takes place when the handle 19, for example, stands at right angles to the body of the car, and as the handle 19 is carried over toward the left the block 26, which has been brought into engagement with the lower or spring end of the pitman, will cause the said pitman to move quickly outward, causing the auxiliary steps to be carried almost instantly past the center of their pivot, whereupon the auxiliary steps will instantly drop downward to the position shown in Fig. 6 and form a continuation of the ordinary steps. When the auxiliary steps are in their lower position, the block 26 will bear against the pin 27, secured to one of the main string-pieces, while at the same time the lock-lever 22 will be entered into one of the recesses in the ratchet-wheel 20. When the handle 19 is carried toward the right, the auxiliary steps will be carried upward and folded upon the main steps and the shaft will be prevented from turning accidentally by the lock-lever 22 entering one of the recesses in the ratchet-wheel on the shaft.

The device is exceedingly simple and economic. It is durable and may be readily applied to the steps now in use.

Having thus described my invention, I claim as new and desire to secure by Letters Patent—

1. The combination with car-steps, the lowermost step being pivoted, and an extension-step carried by said pivoted step, of means for moving said pivoted and extension steps, said means consisting of a shaft mounted upon the car-platform, a flexible pitman having a crank connection with said shaft and connected to said pivoted step by a link, and means connected to said pitman for springing said pivoted step past the center of its pivot, as and for the purpose specified.

2. The combination with car-steps, the lower one of which is pivoted, and an auxiliary step carried by said pivoted step, of a shifting shaft, a pitman of spring material connected with said shaft and pivoted step to turn the same, and means for springing said pivoted step past the center of its pivot, as and for the purpose specified.

3. The combination with car-steps, the lowermost step being pivoted, and an auxiliary step attached to the pivoted step moving therewith, the auxiliary step in the upper position being adapted to rest upon one of the fixed steps, of a shifting shaft provided with a locking device, a pitman having a crank connection with the shifting shaft, a link pivoted to the said pitman, and having a crank connection with the pivoted step, and a block of triangular shape attached to the rear of the said link, and adapted in one position of the link to engage with the said pitman, as and for the purpose set forth.

4. The combination with car-steps, the lowermost step being pivoted, and an auxiliary step attached to the pivoted step and moving therewith, the auxiliary step in its upper position being adapted to rest upon one of the fixed steps, of a shifting shaft provided with a locking device, a pitman having a crank connection with the shifting shaft, a link pivoted to the said pitman and having a crank connection with the pivotal step, a block of triangular shape attached to the rear of the said link, and adapted in one position of the link to engage with the said pitman, a pivoted handle for the shifting shaft, and a stop attached to the supports of the steps, the said stop being adapted for engagement with the block attached to the link when the auxiliary step is in its lower position, for the purpose specified.

5. The combination with car-steps, the lower one of which is pivoted, and an auxiliary step carried by said pivoted step, of a shifting shaft, a flexible pitman connected to said shaft, a link connecting said pitman with said pivoted step and a block attached to said link and engaging with said pitman to change the direction of its movement whereby the pivoted step will be moved past the center of its pivot, as and for the purpose specified.

STEPHAN OLIGER.

Witnesses:
BARNEY WESTGERDES,
FRANK WESTGERDES.